United States Patent Office 2,737,478
Patented Mar. 6, 1956

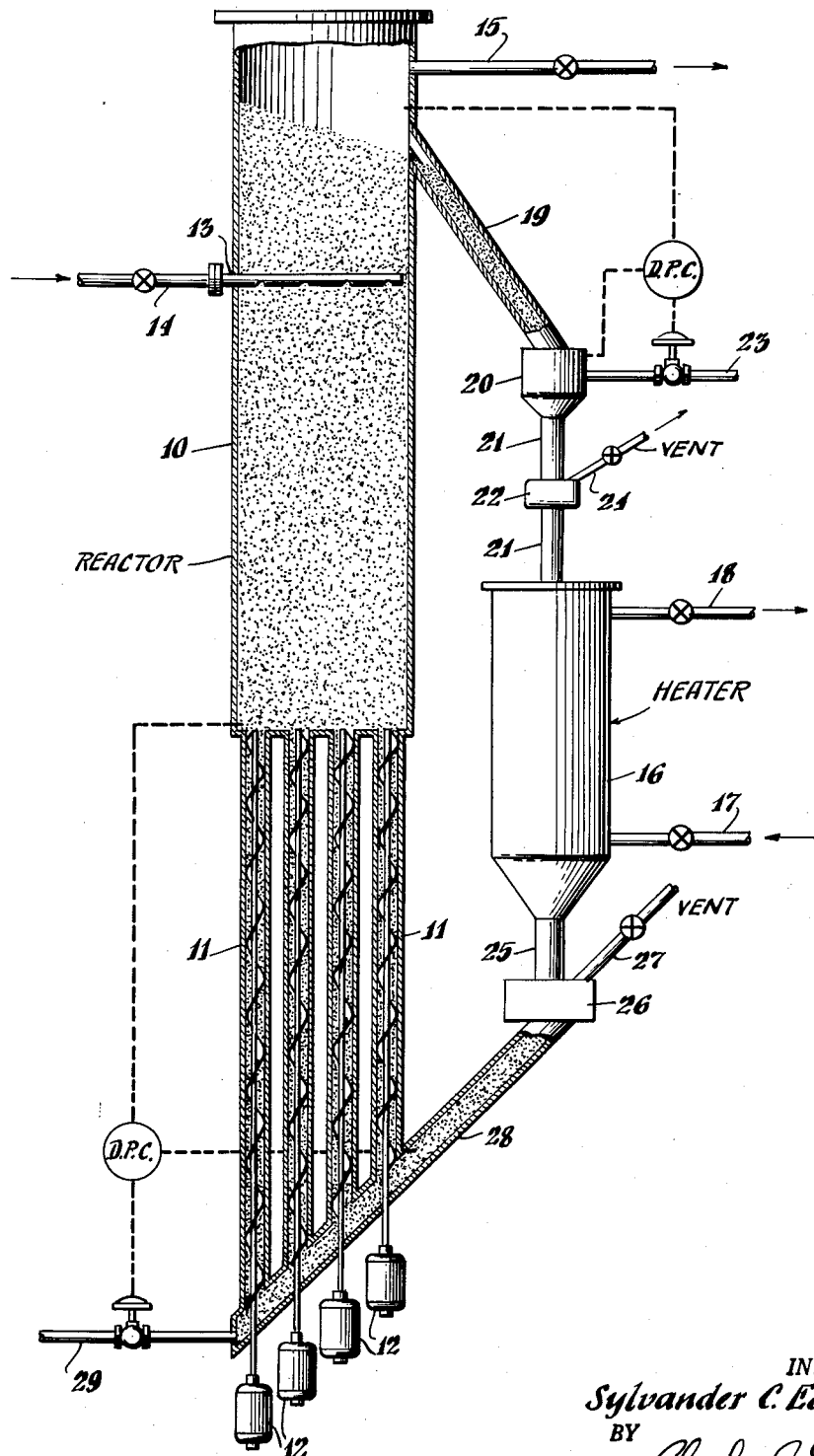

2,737,478

HYDROCARBON CONVERSION PROCESS

Sylvander C. Eastwood, Woodbury, N. J., assignor to Socony Mobil Oil Company, Inc., a corporation of New York Application February 13, 1952, Serial No. 271,347

4 Claims. (Cl. 196—55)

This invention is directed to the contacting of fluids with solid contact materials for the purpose of effecting conversion of the fluids. It is more particularly directed to an improved method of converting hydrocarbons in liquid form in the presence of a moving mass of solid particles of hot contact material.

Moving masses of contact material granules have been used successfully to effect the conversion of hydrocarbons by bringing the solids into contact with the hydrocarbons continuously in a conversion zone. The solids are passed cyclically through the conversion zone where conversion is effected and then through a regenerating or reconditioning zone wherein it is contacted with a suitable gas for reconditioning said contact material to a condition suitable for reuse in said conversion zone.

Typical of processes to which the invention may be applied is the catalytic conversion of liquid hydrocarbons to lower boiling, gasoline containing, gaseous products by the contacting of a high boiling liquid charge at temperatures of the order of 850° F. and above with a moving bed of granular absorbent catalytic material. Other exemplary processes to which this invention may be applied are the thermal visbreaking, coking or cracking of liquid or mixed phase hydrocarbon charge by contact with heated granular inert contact material.

In such processes, wherein the contact material is catalytic in nature, it may partake of the nature of natural or treated clays, bauxite, activated alumina or synthetic associations of silica, alumina, or silica and alumina to which other substances such as certain metallic oxides may be added in small amounts for specific purposes. When the contact material is inert in character it may partake of the form of refractory materials such as zirkite, corhart material, mullite or it may partake of the form of stones or metallic particles or balls. It is desirable to maintain the size of the contact material particles within the range about 3 to 100 mesh and preferably within the range 4 to 20 mesh by Tyler Standard Screen Analysis.

The term "gaseous" as used in this specification and claims is intended to refer to a material in the gaseous phase at the particular operating conditions of temperature and pressure involved regardless of what may be the normal phase of that material under ordinary atmospheric conditions. Similarly, "liquid" is intended to refer to a material in the liquid phase at the particular operating conditions involved regardless of its normal state under atmospheric conditions. The expression "contact material" is employed herein in a broad sense as covering solid particles which are suitable as a contacting or heat carrying agent for the particular conversion involved regardless of whether such solid particles exhibit a catalytic effect toward the conversion or not. The term "granular" is used herein to denote pelleted, tableted, or spherical particles or pieces of regular or irregular shape and of palpable particulate form as distinguished from powdered material.

Formerly, only selected crudes were cracked which assumed a vapor state at the cracking temperature. The heavy demand for cracked products has made it necessary to charge heavier stocks to the reactor in liquid form at the existing temperature and pressure conditions. It has been discovered that when liquid feed is sprayed onto the top of the gravitating bed there is a pronounced tendency for the liquid to drain down through the bed. The contact period with the hot catalyst in the top of the bed is not sufficient to crack all the liquid reactants. A substantial amount of the conversion is effected in the lower portion of the bed under less favorable conditions. Because of the lower bed temperatures in the lower portions of the bed, undesirable amounts of cokey and tarry materials are deposited on the surface of the catalyst and less gasoline constituents are produced than desired. It has been particularly noted in moving bed coking process when using a non-porous heat transfer material at low contact material to oil ratios that the oil runs down through the bed without becoming coked.

In my invention these difficulties in liquid solid contacting are overcome by moving the contact material upwardly through the reaction zone as a substantially solid moving mass of hot particles and introducing the liquids at a level in the upper portion of the moving mass. The reaction vapor products are withdrawn from the top of the mass. The contact material is removed from the top of the reaction zone and gravitated through a heating or regenerating zone beside the reaction zone to complete an enclosed cyclic path.

The object of this invention is to provide an improved method of contacting hydrocarbons in liquid form with a substantially compacted mass of particle form contact material.

A further object of this invention is to provide a process for contacting liquid hydrocarbons with a moving mass of solid contact particles which overcomes the above-indicated difficulties.

These and other objects will become more apparent in the following detailed discussion of the invention. The figure is a highly diagrammatic showing of a system which illustrates the application of the invention.

Referring to the figure, an elongated vertical reaction vessel 10 is shown over a multiplicity of vertical screw conveyors 11. Screw conveyors are well known in the hydrocarbon art and need not be described in detail. The helical drive members of the conveyors are driven by motors 12 attached to the extensions of the shafts of the drive members. When desired, gear boxes can be interposed between the motors and drive shafts to effect a speed reduction. A liquid supply manifold 13 is located in the upper portion of the vessel 10. The manifold has orifices suitably located to effect uniform distribution of the liquids into the bed of contact material in the vessel. A supply conduit 14 is attached to the manifold 13. A withdrawal conduit 15 is attached near the top of the vessel for conducting the vapors from the vessel to other refinery processing apparatus, not shown. A vertical heating vessel 16 is shown alongside the reactor. A gas inlet conduit 17 is attached to the bottom of the vessel and an outlet conduit 18 is attached to the top. A conduit 19 connects the upper end of the reactor with a supply hopper 20 located above the heater. A depending conduit 21 connects the bottom of the hopper with the top of the heater. A depressurizer 22 is attached to the conduit 21 intermediate its length. Inert seal gas is introduced into the hopper 20 through the conduit 23 which connects with the hopper. The depressurizer 22 may be vented to atmosphere when desired by means of vent pipe 24. A conduit 25 is attached to the bottom of the heater 16 to conduct the hot contact material to a chamber 26. The chamber 26 may be vented to atmosphere when desired by means of the vent pipe 27. The conduit 28 connects the bottom of chamber 26 with the bottom ends of the vertical screw conveyors 11. Conduit 29 is fastened to the lower end of conduit 28 and serves to introduce an inert gas into the conduit for sealing purposes.

In a coking operation, for example, coke at a temperature of about 850–950° F. is removed from the top of the bed in the reactor and gravitated through the conduit 19 to the supply hopper 20. The particles gravitate through the conduit 21 into the top of the heater 16 forming a gravitating bed in said heater. Air is introduced into the bed, by suitable gas introduction means, at a low level and is passed upwardly through the gravitating bed to burn off at least a substantial amount of the cokey contaminant deposited on the coke particles during the reaction. The flue gas produced is withdrawn from the vessel through the conduit 18. During the burning the temperature of the particles is raised to about 1000–1300° F. The heated particles are gravitated from the bottom of the bed downwardly through the conduit 25, chamber 26 and conduit 28 to the bottom of the screw conveyors 11. The particles are moved continuously upward through the conveyors into the vessel 10 in substantially compacted form. The conveyors are distributed about the bottom of the vessel so as to effect substantially uniform upward movement of the mass in the reaction vessel 10. The hydrocarbons, at least partially in liquid form, are introduced through the manifold 13 into the upper portion of the bed. The manifold is suitably designed to distribute the hydrocarbons uniformly across the column of upwardly moving contact material. The hydrocarbons may be a reduced crude heated to a temperature of about 600–800° F. The lighter material flashes to a vapor on contacting the hot particles and travels upwardly through the bed. The heavy material having a higher boiling point travels downwardly through the bed. However, since the bed moves upwardly, the liquids contact hotter and hotter contact material the further they travel downward in the bed. It is found that after a suitable soaking period, the hot contact material in the bottom of the bed effects the conversion of the heavier ends of the reactant charge. The reactants are therefore cracked and vaporized. The vapors then pass upwardly through the bed, contacting cooler contact material in the upper portion of the bed. The heavier ends are condensed in the cool portion and drain downwardly through the bed to again hit hotter contact material. The higher boiling liquids remain, therefore, in the reaction zone a longer period than the lower boiling liquids and are eventually cracked before removal from the zone. It should be noted that since the vapors contact the cooler contact material before being withdrawn from the bed, the boiling range and carbon residue of the distillate are controlled within a prescribed range.

The reaction zone is usually operated at an advanced pressure in these conversion processes, for example, 5–30 p. s. i. (gauge). Normally it is found more convenient to operate the regenerator or kiln at substantially atmospheric pressure, and therefore the vessels must be sealed to prevent mingling of the gases. Referring to the sketch, a suitable inert seal gas can be admitted through conduit 23 into the hopper 20. The flow of inert gas is controlled by the dual pressure controller to maintain the pressure in the hopper 20 just above the pressure in the reaction vessel 10. A small amount of the inert gas is forced upwardly through the gravitating column of solids into the reaction vessel 10, thereby preventing the escape of reaction products. The pressure is reduced by means of the depressurizer 22 to substantially atmospheric. In some instances it may be desirable to operate the vessels at the same pressure, in which case the depressurizer may be eliminated. In other cases the kiln may be operated at a pressure higher than the reactor. But generally the reactor will be operated at a higher pressure than the heater or kiln. The bottom of the reaction vessel may be sealed by introducing inert gas through the conduit 29. The gas flow is controlled by means of the dual pressure controller to maintain the pressure in the conduit 28 just above the pressure in the lower portion of the vessel 10, thereby preventing downward movement of vapors from the vessel 10 through the conveyors 11. When using cracking catalysts which are damaged by excessive heat, suitable cooling coils can be located in the regenerator to effect temperature adjustment of the catalyst particles which is maintained high enough to effect the desired conversion without causing damage to the particles by overheating.

The feed charged to the reactor may be all liquid or partially liquid and partially vapor. The bed of catalyst above the feed introduction manifold is preferably made high enough so that vapors in the feed will be cracked by passage upwardly through the bed. The bed beneath the manifold 13 is made deep enough so that the heavy liquids are suitably soaked, at the conditions existing in the vessel, before reaching contact material hot enough to effect the desired conversion reaction. The precise location of the manifold 14 and the depth of the contact bed depends upon many factors and can only be determined after the factors, such as type of feed, temperature of feed, catalyst circulation rate, catalyst temperature etc. have been determined.

However, the depth of the bed above the manifold is made deep enough so there is a substantial drop in temperature between the manifold and the top of the bed. Therefore, oil vapors passing up from the inlet level contact cooler particles and if the vapors boil above the temperature of the particles in the top of the bed, they are condensed. The condensed liquids are further cracked until they boil below the temperature of the particles at the top of the bed. Thus by controlling the temperature of the solids at the top of the bed within the range of about 800 to 1000° F. and preferably 850 to 925° F., and by providing at least 5 ft. and preferably 10 to 15 ft. of bed above the charge inlet level, the maximum boiling range of vapors from the reactor is 100° F. and preferably below 925° F. and a good vapor phase feed for catalytic cracking is provided. The depth of bed below the charge inlet level can be made materially shorter than prior art coking or cracking processes in which the particles are gravitated downwardly through the reaction zone because the feed contacts progressively hotter coke. Liquid not vaporized at the inlet level is vaporized therebelow not only by virtue of soaking time but also by virtue of the higher reaction temperature. For example, the bed length below the charge inlet may be reduced by about 70 per cent broadly but preferably not over 50 per cent when using upward movement of the solid particles instead of downward movement of the particles. Similarly, the residence time may be reduced 70 per cent but preferably not more than 50 per cent in the upflow reactor.

It should be understood that this invention covers all modifications and changes of the example, herein chosen to illustrate the invention for purposes of disclosure, which do not constitute departures from the spirit and scope of the invention.

I claim:

1. The method for converting high boiling hydrocarbons, at least partially in the liquid phase, to lower boiling material, which comprises: maintaining a substantially compact mass of particle-form solid contact material within a confined conversion zone, heating contact material to a temperature suitable for the desired conversion and forcing the heated contact material into the lower end of the compact mass so that contact material is forced upwardly through the mass, supplying a hydrocarbon feed, at least partially in the liquid phase, to said mass at a level intermediate its top and bottom, withdrawing hydrocarbon vapors from the upper section of the mass and withdrawing contact material from the upper end of the mass at a temperature substantially below that at which it was introduced to the conversion zone.

2. An improved method for converting high boiling hydrocarbons, at least partially in the liquid phase, to lower boiling material, which comprises: maintaining a substantially compact mass of particle-form solid contact material within a confined conversion zone, heating the contact material within a confined heating zone to a temperature suitable for the desired conversion and forcing the heated material into the lower section of said mass so as to force contact material upwardly through the mass, introducing a hydrocarbon charge, at least partially in the liquid phase, into the mass at an intermediate level along its length, withdrawing gaseous products of conversion from the upper end of said column, withdrawing contact material from the top of the column at a temperature substantially below the temperature of contact material in the lower section of the column and transferring the contact material so withdrawn to the heating zone to complete an enclosed cyclic path.

3. An improved process for coking heavy hydrocarbons, supplied at least partially in the liquid phase, which comprises: maintaining a substantially compact column of inert solid contact material within a confined conversion zone, said column being substantially unbaffled along all vertical planes through it, heating contact material in a confined heating zone to a temperature sufficient to effect the coking, gravitating the heated contact material from the heating zone downwardly to a position beneath the conversion zone, forcing hot contact material from said position into the bottom of the column within the conversion zone so that contact material particles move upwardly through the column, supplying hydrocarbon charge a substantial fraction of which is in the liquid phase at the conditions within the conversion zone to an intermediate level in said column so that gaseous material passes upwardly through the upper section of the column while liquid flows downwardly through the lower section of the column, withdrawing gaseous material from the upper section of the conversion zone at a level above said column, withdrawing contact material from the top of said column at a temperature substantially below that of the contact material at the bottom of the column, gravitating contact material so withdrawn into and through said heating zone, supplying a combustion supporting gas to said heating zone to effect combustion of carbonaceous material deposited on the contact material by the coking reaction and to again heat the contact material to a temperature sufficient to supply the heat required by the conversion reaction and removing flue gas from the heating zone.

4. An improved conversion process for cracking hydrocarbons which are supplied to the conversion zone, at least partially in the liquid phase, which comprises: maintaining a column of solid particle-form contact material within a confined conversion zone, said column being substantially unbaffled along all vertical planes through it, heating solid contact material in a heating zone to a level sufficient to supply the heat required by the conversion reaction without exceeding the temperature at which the contact material would be heat damaged, withdrawing hot contact material from the heating zone and forcing it into the lower section of the column maintained within the conversion zone so that contact material particles pass upwardly through the column, the temperature of the column increasing from bottom to top, supplying a hydrocarbon charge at least partially in the liquid phase to said column at a level near its vertical mid-point, the height and temperature of the portion of the column above the level of charge supply being sufficient to effect conversion of vapors passing upwardly therethrough and the height and temperature of the portion of the column below the level of charge supply being sufficient to effect conversion of the downwardly flowing liquid charge to gaseous phase material, withdrawing reaction products from the upper section of the conversion zone at a level above the bed and withdrawing used contact material from the top of the column at a temperature substantially below that at the bottom of the column and passing the contact material so withdrawn into the heating zone.

References Cited in the file of this patent

UNITED STATES PATENTS

| 1,529,095 | Thompson et al. | Mar. 10, 1925 |
| 1,530,627 | Thompson et al. | Mar. 24, 1925 |
| 2,097,084 | Smith | Oct. 26, 1937 |
| 2,317,379 | Hemminger | Apr. 27, 1943 |
| 2,566,159 | Beckberger | Aug. 28, 1951 |
| 2,623,010 | Schutte | Dec. 23, 1952 |

OTHER REFERENCES

Ser. No. 434,440, Woog (A. P. C.), published June 1, 1943.